(12) United States Patent
Furuta et al.

(10) Patent No.: US 8,581,144 B2
(45) Date of Patent: Nov. 12, 2013

(54) LASER PROCESSING APPARATUS AND LASER PROCESSING METHOD

(75) Inventors: Kenji Furuta, Ota-ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 1062 days.

(21) Appl. No.: 12/535,496

(22) Filed: Aug. 4, 2009

(65) Prior Publication Data

US 2010/0044358 A1 Feb. 25, 2010

(30) Foreign Application Priority Data

Aug. 25, 2008 (JP) ................................ 2008-214856

(51) Int. Cl.
*B23K 26/06* (2006.01)
(52) U.S. Cl.
USPC ............ 219/121.75; 219/121.78; 219/121.83
(58) Field of Classification Search
USPC .............................. 219/121.62, 121.7, 121.83
See application file for complete search history.

(56) References Cited

U.S. PATENT DOCUMENTS

| | | | | |
|---|---|---|---|---|
| 4,733,065 A | * | 3/1988 | Hoshi et al. | 250/206.2 |
| 2001/0035991 A1 | * | 11/2001 | Hobbs et al. | 359/35 |
| 2002/0006731 A1 | * | 1/2002 | Nakano et al. | 438/710 |
| 2006/0243708 A1 | * | 11/2006 | Ikenoue | 219/121.62 |
| 2010/0219171 A1 | * | 9/2010 | Sato et al. | 219/121.75 |

FOREIGN PATENT DOCUMENTS

| | | |
|---|---|---|
| JP | A 10-305420 | 11/1998 |
| JP | A 2002-192370 | 7/2002 |
| JP | A 2007-152355 | 6/2007 |
| JP | A 2008-16577 | 1/2008 |

* cited by examiner

*Primary Examiner* — Zandra Smith
*Assistant Examiner* — Tsz Chiu
(74) *Attorney, Agent, or Firm* — Greer, Burns & Crain, Ltd.

(57) ABSTRACT

A laser processing apparatus including a holding unit for holding a workpiece, a processing unit for applying a laser beam to the workpiece held by the holding unit, a surface displacement detecting unit for detecting a surface displacement of the workpiece, and a focal position adjusting unit for adjusting the position of a focusing lens provided in the processing unit according to the surface displacement detected. The surface displacement detecting unit includes a detecting light source capable of oscillating light having a plurality of wavelengths different from the wavelength of the laser beam and a wavelength selecting section configured to select one of the plurality of wavelengths as the wavelength of detecting light. The detecting light having the selected wavelength is focused by the focusing lens and applied to the workpiece.

4 Claims, 2 Drawing Sheets

LASER PROCESSING APPARATUS AND LASER PROCESSING METHOD

BACKGROUND OF THE INVENTION

1. Field of the Invention

The present invention relates generally to a laser processing apparatus and a laser processing method for processing a workpiece such as a semiconductor wafer by using a laser beam, and more particularly to a technique for correcting the focal position of the laser beam.

2. Description of the Related Art

In a semiconductor device fabrication process, a plurality of circuits such as ICs (integrated circuits) and LSIs (large-scale integrated circuits) are formed like a matrix on the surface of a substantially disk-shaped semiconductor wafer, and this wafer thus formed with the plural circuits is next cut along a plurality of crossing streets (division lines) to thereby divide the plural circuits from each other as chips. Also in a fabrication process for optical devices such as light emitting diodes and laser diodes widely used in electrical equipment, a gallium nitride compound semiconductor or the like is formed on the surface of a substrate such as a sapphire substrate to obtain an optical device wafer, and this wafer is next cut along a plurality of division lines to divide individual devices from each other as chips.

Cutting (dicing) of such various wafers is performed by using a cutting apparatus called a dicer. As another method, there has recently been developed a method of cutting a workpiece such as a semiconductor wafer by using a laser beam (see Japanese Patent Laid-open No. Hei 10-305420 and Japanese Patent No. 3408805, for example). Japanese Patent Laid-open No. Hei 10-305420 discloses a laser processing method such that a laser beam is applied to a workpiece formed from a single crystal oxide to dissociate and evaporate the molecules of the single crystal oxide by a photochemical reaction, thereby forming a groove at a predetermined position on the workpiece. Then, the workpiece is cleaved along this groove.

Japanese Patent No. 3408805 discloses a laser cutting method such that a pulsed laser beam having a transmission wavelength to a workpiece is applied to the workpiece in the condition where the focal position of the laser beam is set inside the workpiece, thereby forming a modified layer along each division line. This modified layer is smaller in strength than the other region of the workpiece. Accordingly, by applying an external force along each division line, the workpiece is divided along each division line in such a manner that the division is started from the modified layer.

In some workpieces to be processed, there is a possibility that warpage or undulation may occur or the surface of the workpiece may not become flat to cause the formation of roughness during any process steps before a dicing step. In the case of processing such a workpiece, the surface displacement of a subject surface of the workpiece is not constant, so that the focal position of the laser beam varies in a direction along the thickness of the workpiece, causing a reduction in processing accuracy. In the laser processing method for forming a modified layer inside the workpiece as mentioned above, the effect of warpage, undulation, and roughness of the workpiece is especially profound. To cope with this problem, there has been proposed a laser processing apparatus including means for measuring the surface displacement in a laser beam applying region of the workpiece in advance, means for adjusting the focal position of a laser beam in a direction along the thickness of the workpiece according to the result of measurement by the above measuring means, and means for applying the laser beam to the workpiece (see Japanese Patent Laid-open Nos. 2007-152355 and 2008-16577, for example).

However, the laser processing apparatus described in Japanese Patent Laid-open Nos.125 2007-152355 and 2008-16577 has a problem such that when the processing position, i.e., the focal position of the processing laser beam is far from the surface of the workpiece, it is impossible to measure the surface displacement during laser processing and it is therefore impossible to correct the focal position of the processing laser beam in real time, thus causing a reduction in processing efficiency. That is, in the laser processing apparatus described in Japanese Patent Laid-open Nos. 2007-152355 and 2008-16577, the focal point of a detecting laser beam and the focal point of the processing laser beam are set at the same position. Accordingly, in the case of focusing the processing laser beam inside the workpiece at a deep position, the spot diameter of the detecting laser beam on the surface of the workpiece becomes large.

In this conventional laser processing apparatus, the surface displacement of the workpiece is detected from the light quantity of reflected light reflected on the surface of the workpiece by the application of the detecting laser beam to the workpiece. Accordingly, when the spot diameter of the detecting laser beam is large, the light quantity of the reflected light per unit area is reduced, so that the surface displacement of the workpiece cannot be accurately measured. Particularly in the case of applying a processing laser beam to a thick workpiece plural times starting at a focal position near the surface of the workpiece on the back side thereof, the distance between the focal position of the processing laser beam and the surface of the workpiece on the front side thereof becomes large, so that there is a possibility that the measurement itself of the surface displacement cannot be performed. For this reason, in the laser processing apparatus described in Japanese Patent Laid-open Nos. 2007-152355 and 2008-16577 mentioned above, the detecting laser beam is applied to the workpiece prior to laser processing to preliminarily measure the surface displacement of the workpiece. Thereafter, the focal position of the processing laser beam is adjusted to perform laser processing.

SUMMARY OF THE INVENTION

It is therefore an object of the present invention to provide a laser processing apparatus and a laser processing method which can correct the focal position of a laser beam in real time irrespective of the thickness of a workpiece and can accurately process the workpiece without preliminarily measuring a surface displacement of the workpiece even in the case that the surface displacement in a laser beam applying region of the workpiece is not constant.

In accordance with an aspect of the present invention, there is provided a laser processing apparatus for processing a workpiece by using a laser beam, including: holding means for holding the workpiece; processing means for applying the laser beam to the workpiece held by the holding means, the processing means having an oscillator for oscillating the laser beam and a focusing lens for focusing the laser beam toward the workpiece; surface displacement detecting means for detecting a surface displacement of the workpiece; and focal position adjusting means for adjusting the position of the focusing lens according to the result of detection by the surface displacement detecting means; the surface displacement detecting means including a detecting light source capable of oscillating light having a plurality of wavelengths different from the wavelength of the laser beam; a wavelength selecting section configured to select one of the plurality of wavelengths as the wavelength of detecting light; a detecting light applying section configured to introduce to the focusing lens the detecting light oscillated from the detecting light source and having the wavelength selected by the wavelength selecting section; and a detecting section configured to detect reflected light reflected on the workpiece by the application of the detecting light to the workpiece.

In the present invention, the detecting light source of the surface displacement detecting means is capable of oscillating light having a plurality of wavelengths, and the wavelength selecting section of the surface displacement detecting means selects one of the plurality of wavelengths as the wavelength of the detecting light. Accordingly, the focal position of the detecting light can be set on or near the surface of the workpiece irrespective of the thickness of the workpiece and the processing conditions. As a result, the surface displacement of the workpiece can be measured even during laser processing and the focal position of the laser beam can therefore be corrected in real time. Preferably, the wavelength selecting section selects the wavelength of light to be focused on or near the surface of the workpiece according to the thickness of the workpiece and/or the focal position of the laser beam.

Preferably, the laser processing apparatus further includes control means for operating the focal position adjusting means according to the result of detection by the surface displacement detecting means. Preferably, the surface displacement detecting means further includes an optical member for introducing the reflected light to the detecting section, and optical paths for the laser beam, the detecting light, and the reflected light at least between the focusing lens and the workpiece are coaxial.

In accordance with another aspect of the present invention, there is provided a laser processing method for processing a workpiece by using a laser beam, including a surface displacement detecting step of detecting a surface diplacement of the workpiece; and a processing step of applying the laser beam to the workpiece as adjusting the focal position of the laser beam according to the result of detection by the surface displacement detecting step; wherein the surface displacement detecting step includes the step of oscillating detecting light having one of a plurality of wavelengths different from the wavelength of the laser beam and selected so that the detecting light is focused on or near the surface of the workpiece.

In the present invention, one of the plurality of wavelengths different from the wavelength of the laser beam for processing is selected as the wavelength of the detecting light such that the focal position of the detecting light is set on or near the surface of the workpiece and irradiated. Therefore, the surface displacement of the workpiece can be measured during laser processing and the focal position of the laser beam can be corrected in real time irrespective of the thickness of the workpiece.

Preferably, the wavelength of the detecting light is selected according to the thickness of the workpiece and/or the focal position of the laser beam. Preferably, the laser processing method further includes the step of calculating the surface displacement of the workpiece from a change in light quantity of reflected light reflected on the workpiece by the application of the detecting light to the workpiece. Preferably, optical paths for the laser beam, the detecting light, and the reflected light are partially coaxial.

According to the present invention, one of the plural wavelengths of the light that can be oscillated from the detecting light source is selected as the wavelength of the detecting light, and the detecting light having the selected wavelength is applied to the workpiece. Accordingly, the focal position of the laser beam can be corrected in real time irrespective of the thickness of the workpiece, and the workpiece can be processed accurately even in the case that the surface displacement in a laser beam applying region of the workpiece is not constant.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
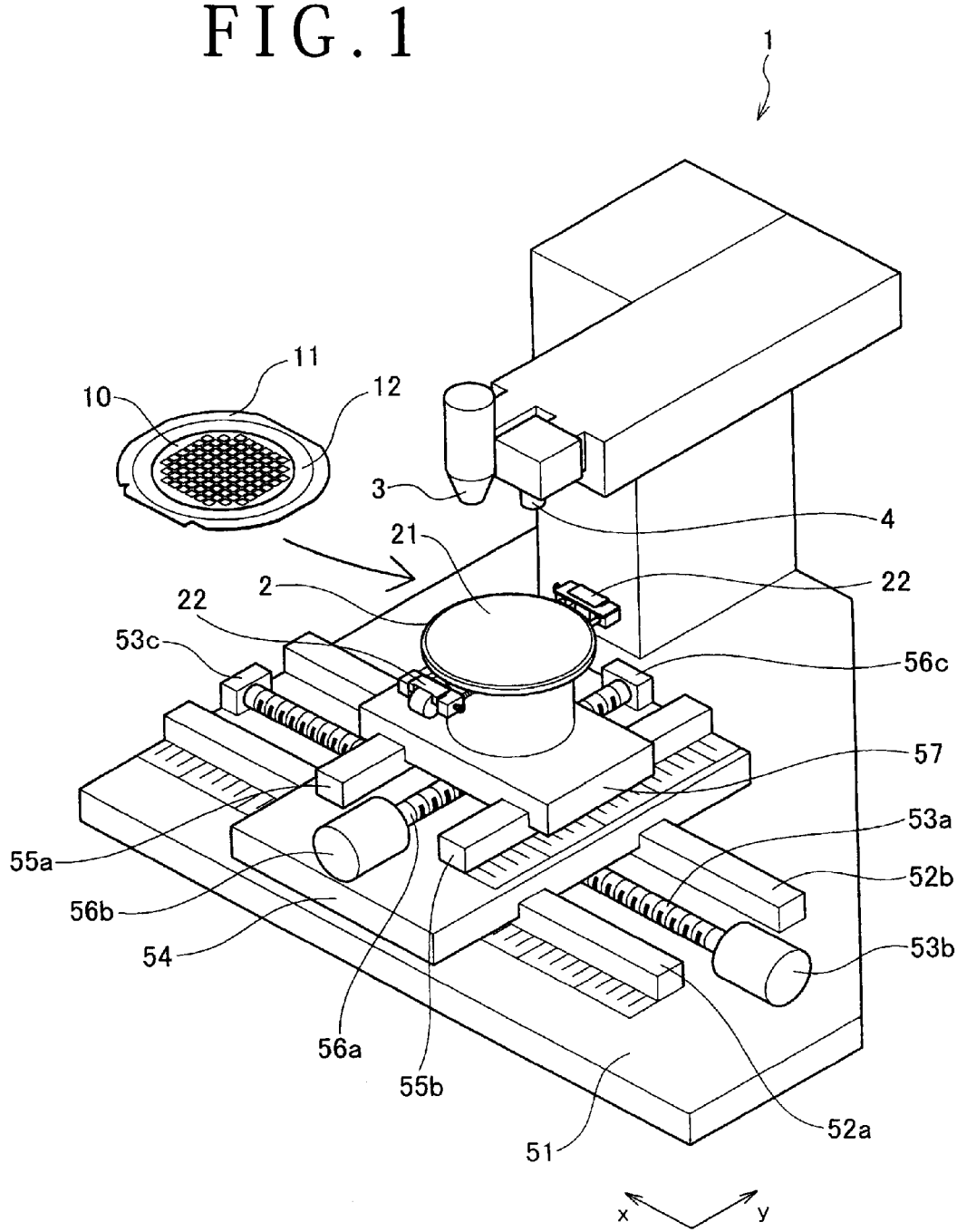
FIG. 1 is a perspective view showing the configuration of a laser processing apparatus according to a preferred embodiment of the present invention.
Figure 2:
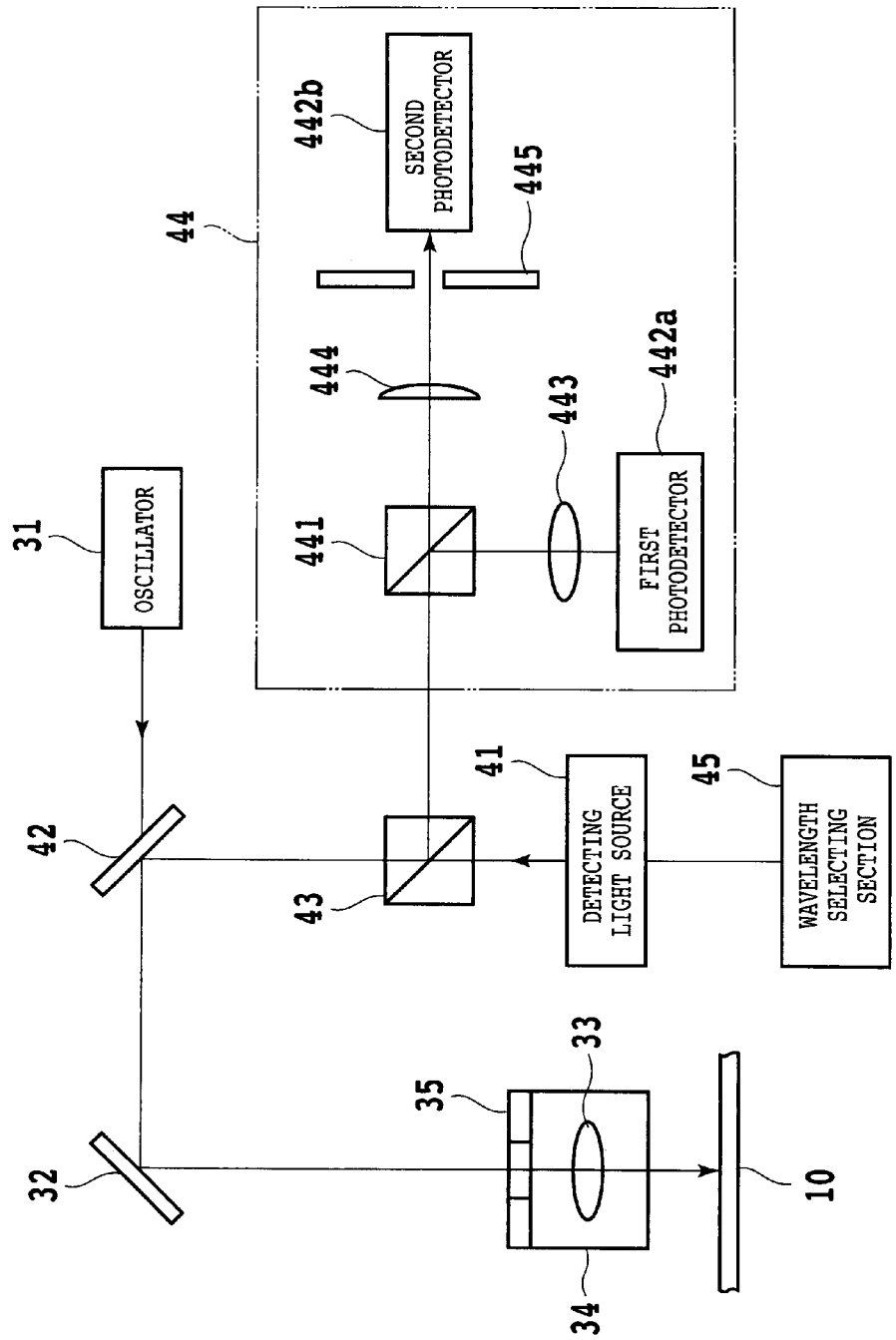
FIG. 2 is a block diagram showing the configuration of an optical system in the laser processing apparatus shown in FIG. 1.

A preferred embodiment of the present invention will now be described with reference to the attached drawings. It should be noted that the present invention is not limited to the following preferred embodiment. FIG. 1 is a perspective view showing the configuration of a laser processing apparatus 1 according to the preferred embodiment, and FIG. 2 is a block diagram showing the configuration of an optical system in the laser processing apparatus 1 shown in FIG. 1.

As shown in FIG. 1, the laser processing apparatus 1 according to this preferred embodiment essentially includes holding means 2 for holding a workpiece 10, processing means for applying a laser beam to a predetermined position on the workpiece 10, surface displacement detecting means for detecting a surface displacement of the workpiece 10, and focal position adjusting means for adjusting the focal position of the laser beam applied from the processing means according to the result of detection by the surface displacement detecting means. The processing means, the surface displacement detecting means, and the focal position adjusting means are provided in a laser beam applying unit 3 located above the holding means 2.

Examples of the workpiece 10 to be processed by the laser processing apparatus 1 according to this preferred embodiment may include a semiconductor wafer, an adhesive tape such as a DAF (Die Attach Film), various substrates formed of inorganic materials such as glass, silicon, and sapphire, metallic materials, or plastic materials, a semiconductor product package, and various work materials required to ensure an accuracy on the order of micrometers. The workpiece 10 is processed in the condition where it is supported through an adhesive tape 12 to an opening portion of a ring frame 11, wherein the adhesive tape 12 is attached to the back side of the workpiece 10.

The holding means 2 of the laser processing apparatus 1 essentially includes a holding surface 21 for holding the workpiece 10 thereon. For example, the holding means 2 is provided by a chuck table for holding the workpiece 10 under suction utilizing the negative pressure. The holding means 2 further includes a plurality of clamps 22 for detachably fixing the ring frame 11 as required.

The holding means 2 is movable in an x direction and a y direction perpendicular to the x direction by feeding means.

More specifically, this feeding means has the following configuration. A pair of parallel guide rails 52a and 52b are provided on a base 51 and a ball screw 53a is arranged between the guide rails 52a and 52b in parallel thereto. A motor 53b is mounted at one end of the ball screw 53a, and the other end of the ball screw 53a is rotatably supported to a bearing block 53c.

Further, a sliding block 54 is movably provided on the guide rails 52a and 52b and the ball screw 53a. A pair of parallel guide rails 55a and 55b are provided on the sliding block 54 and a ball screw 56a is arranged between the guide rails 55a and 55b in parallel thereto. A motor 56b is mounted at one end of the ball screw 56a, and the other end of the ball screw 56a is rotatably supported to a bearing block 56c. Further, a sliding block 57 is movably provided on the guide rails 55a and 55b and the ball screw 56a. The holding means 2 is provided on the sliding block 57.

The feeding means having the above configuration is operated in the following manner. When the ball screw 53a is driven by the motor 53b, the sliding block 54 is moved in the x direction as being guided by the guide rails 52a and 52b, thereby moving the holding means 2 in the x direction. On the other hand, when the ball screw 56a is driven by the motor 56b, the sliding block 57 is moved in the y direction as being guided by the guide rails 55a and 55b, thereby moving the holding means 2 in the y direction.

The processing means is essentially located so that it can apply a laser beam to the workpiece 10. For example, the processing means is provided in the laser beam applying unit 3 located above the holding means 2 as shown in FIG. 1. As shown in FIG. 2, the processing means essentially includes an oscillator 31 for oscillating a processing laser beam, a total reflection mirror 32 for changing the traveling direction of the laser beam, and a focusing lens 33 for focusing the laser beam, the focusing lens 33 being not corrected in chromatic aberration. In this case, the laser beam oscillated from the oscillator 31 is reflected by the total reflection mirror 32 toward the focusing lens 33, and the laser beam is focused by the focusing lens 33 toward the workpiece 10.

The oscillator 31 of the processing means is suitably selected according to the kind of the workpiece 10, the form of processing, etc. For example, a YAG laser oscillator or a YVO4 laser oscillator may be used. Further, a plurality of mirrors may be provided instead of the single total reflection mirror 32 between the oscillator 31 and the focusing lens 33. In this preferred embodiment, the focusing lens 33 is accommodated in a case 34.

The focal position adjusting means in the laser processing apparatus 1 essentially has a configuration such that it can adjust the focal position of the laser beam in the direction perpendicular to the workpiece 10 according to the result of detection by the surface displacement detecting means. For example, the focal position adjusting means is realized by mounting an actuator 35 on the case 34 as shown in FIG. 2. The actuator 35 may be provided by a piezoelectric motor configured by a piezoelectric element axially expanding according to an applied voltage value.

The focal position adjusting means may further include guide rails and a drive motor for moving the laser beam applying unit 3 in the direction perpendicular to the workpiece 10, in addition to the actuator 35 described above. In the case that the whole of the laser beam applying unit 3 is movable, fine adjustment by the actuator 35 can be performed after adjusting the position of the laser beam applying unit 3. Accordingly, the focal position of the laser beam can be adjusted with a high accuracy.

The surface displacement detecting means in the laser processing apparatus 1 of the embodiment essentially includes a detecting light source 41 for oscillating light (detecting light) having a wavelength reflecting on the surface of the workpiece 10 and a detecting section 44 configured to measure a change in light quantity of reflected light from the workpiece 10, thereby obtaining a surface displacement of the workpiece 10. The detecting light source 41 of the surface displacement detecting means is essentially capable of oscillating light having a plurality of wavelengths different from the wavelength of the processing laser beam oscillated from the oscillator 31. For example, an optical parametric oscillator may be used for the detecting light source 41.

As a modification, light emerging from a light source may be separated into spectral components by using a diffraction grating or a prism to extract light having a specific wavelength. In this case, by adjusting the angle of incidence of the light emerging from the light source onto the diffraction grating or the prism, the wavelength of the light as the detecting light to be applied to the workpiece 10 can be arbitrarily changed. As another modification, a plurality of light sources for oscillating light having different wavelengths may be provided and they may be suitably selectively used.

The surface displacement detecting means further essentially includes a wavelength selecting section 45 for selecting one of the plural wavelengths of the detecting light. The wavelength selecting section 45 is connected to the detecting light source 41. As a method of selecting one of the plural wavelengths of the detecting light, the focal positions of the detecting light having the plural wavelengths as measured from the focusing lens may be preliminarily stored in a read only memory (ROM) of control means to be hereinafter described, and a proper wavelength may be selected from the plural wavelengths of the detecting light according to information such as the thickness of the workpiece 10 and the set position of the focal point of the processing laser beam.

By changing the wavelength of light emerging from the detecting light source 41, the refractive index in the focusing lens 33 is changed and the focal position of the detecting light is therefore changed. Accordingly, by arbitrarily selecting the wavelength of the detecting light according to the thickness of the workpiece 10, the processing conditions, etc., the focal position of the detecting light can be set on or near the surface of the workpiece 10 irrespective of the thickness of the workpiece 10. Accordingly, the surface displacement of the workpiece 10 can be detected even during laser processing of the workpiece 10, so that the focal position of the processing laser beam can be corrected in real time.

The surface displacement detecting means further essentially includes a partial transmission mirror 42 and a beam splitter 43 for introducing the detecting light having a selected wavelength emerging from the detecting light source 41 to the focusing lens 33 and introducing the reflected light from the workpiece 10 to the detecting section 44. More specifically, the partial transmission mirror 42 is interposed between the oscillator 31 and the total reflection mirror 32, and the beam splitter 43 is interposed between the detecting light source 41 and the partial transmission mirror 42.

The partial transmission mirror 42 essentially has a configuration such that it can transmit the processing laser beam and can reflect the detecting light and the reflected light. For example, a dichroic mirror may be used as the partial transmission mirror 42. The beam splitter 43 essentially has a configuration such that it can transmit the detecting light emerged from the detecting light source 41 to introduce the detecting light to the partial transmission mirror 42 and can reflect the reflected light reflected on the partial transmission mirror 42 to introduce the reflected light to the detecting section 44. For example, a half mirror may be used as the beam splitter 43.

In the surface displacement detecting means, the detecting light is oscillated from the detecting light source 41 and a part of the detecting light is transmitted through the beam splitter 43. The detecting light transmitted through the beam splitter 43 is reflected on the partial transmission mirror 42 and the total reflection mirror 32 and next focused by the focusing lens 33 to enter the workpiece 10. The light (reflected light) reflected on the surface of the workpiece 10 is transmitted through the focusing lens 33 to enter the total reflection mirror 32. The reflected light from the workpiece 10 is next reflected on the total reflection mirror 32 and the partial transmission mirror 42 to enter the beam splitter 43. A part of the reflected light incident on the beam splitter 43 is reflected by the beam splitter 43 to enter the detecting section 44. In this manner, between the partial transmission mirror 42 and the workpiece 10, an optical path for the processing laser beam, an optical path for the detecting light, and an optical path for the reflected light are coaxially arranged. Accordingly, the configuration of the laser processing apparatus 1 can be made simple, and the optical system can be made compact.

The detecting section 44 includes a beam splitter 441 such as a half mirror for dividing the reflected light from the workpiece 10 into a reflected beam and a transmission beam at an arbitrary ratio, a first photodetector 442a for detecting the reflection beam from the beam splitter 441, a second photodetector 442b for detecting the transmission beam from the beam splitter 441, a focusing lens 443 for focusing the reflection beam from the beam splitter 441 toward the first photodetector 442a, a cylindrical lens 444 for linearly focusing the transmission beam from the beam splitter 441 toward the second photodetector 442b, and a one-dimensional mask 445 for restricting the transmission beam linearly focused by the cylindrical lens 444 to a unit length.

The reflected light to be detected by the first photodetector 442a is focused almost 100% by the focusing lens 443, so that the detected light quantity by the first photodetector 442a is constant. On the other hand, the reflected light to be detected by the second photodetector 442b is linearly focused by the cylindrical lens 444 and next restricted to a predetermined unit length by the one-dimensional mask 445. Accordingly, the detected light quantity by the second photodetector 442b varies according to the distance from the focusing lens 33 to the workpiece 10, i.e., according to the surface displacement of the workpiece 10.

In the laser processing apparatus 1, a voltage signal corresponding to the detected light quantity by the first photodetector 442a and a voltage signal corresponding to the detected light quantity by the second photodetector 442b are output to the control means to be hereinafter described. Then, the control means operates the focal position adjusting means according to the voltage values output from the first and second photodetectors 442a and 442b, thereby adjusting the focal position of the processing laser beam. The configuration of the detecting section 44 is not limited to that shown in FIG. 2 provided that it can detect the surface displacement of the workpiece 10.

The control means in the laser processing apparatus 1 is provided by a computer, which includes a central processing unit (CPU) for performing computations according to a control program, a read only memory (ROM) preliminarily storing the control program, etc., a random access memory (RAM) for storing computational results, etc., an input interface for inputting an output signal from the detecting section 44, and an output interface for outputting an operating signal to the actuator 35. The control means operates the actuator 35 according to the voltage signals output from the detecting section 44 to thereby adjust the position of the focusing lens 33.

The laser processing apparatus 1 further includes imaging means 4 for performing an alignment operation. The imaging means 4 is located above the holding means 2. A subject area of the workpiece 10 to be laser-processed is detected by the imaging means 4.

There will now be described the operation of the laser processing apparatus 1, i.e., a method of processing the workpiece 10 by using the laser processing apparatus 1. In the laser processing method according to this preferred embodiment, the workpiece 10 to be processed is first supported through the adhesive tape 12 to the opening portion of the ring frame 11 as shown in FIG. 1. At this time, the adhesive tape 12 is attached to the back side of the workpiece 10. In this supported condition, the workpiece 10 is placed on the holding means 2 and the ring frame 11 is fixed by the clamps 22. Furthermore, the workpiece 10 is held on the holding surface 21 under suction.

Thereafter, the processing means is operated to apply a processing laser beam having a predetermined wavelength to the workpiece 10 along each division line. For example, in the case that the workpiece 10 is a semiconductor wafer using a silicon substrate and a modified layer is to be formed inside the workpiece 10 by the processing laser beam, a pulsed laser beam having a wavelength of 1064 nm is applied to the workpiece 10. At the same time, the surface displacement detecting means measures the surface displacement of a subject area to which the processing laser beam is applied, i.e., the surface displacement of each division line, and the control means operates the focal position adjusting means according to the result of measurement by the surface displacement detecting means, thereby correcting the focal position of the laser beam in the direction along the thickness of the workpiece 10.

More specifically, when a processing laser beam having a predetermined wavelength is oscillated from the oscillator 31, the laser beam is transmitted through the partial transmission mirror 42 and next reflected on the total reflection mirror 32 to enter the focusing lens 33. The laser beam is focused by the focusing lens 33 to enter the workpiece 10. On the other hand, detecting light having a wavelength selected by the wavelength selecting section 45 and different from the wavelength of the processing laser beam is emitted from the detecting light source 41. The detecting light emitted from the detecting light source 41 is partially transmitted through the beam splitter 43 and next reflected on the partial transmission mirror 42 and the total reflection mirror 32 to enter the focusing lens 33. The detecting light is focused by the focusing lens 33 to enter the workpiece 10.

The position of the focusing lens 33 is decided according to the focal position of the processing laser beam. Accordingly, the wavelength of the detecting light is selected so that the detecting light is focused on or near the surface of the workpiece 10 by the focusing lens 33 set at this predetermined position.

The wavelength of the detecting light may be selected according to the information stored in the ROM of the control means. As a modification, the focusing lens 33 is first set at the predetermined position decided according to the focal position of the processing laser beam. Before applying the processing laser beam, only the detecting light is applied to the workpiece 10 to select a proper wavelength. More specifically, before starting the laser processing, the detecting light is applied to the workpiece 10 as varying the wavelength of the detecting light from a short wavelength to a long wavelength, and a voltage value V1 output from the first photodetector 442a and a voltage value V2 output from the second photodetector 442b are measured. When the ratio (V1/V2) between the voltage value V1 and the voltage value V2 becomes a value corresponding to the case where the detecting light is focused near the surface of the workpiece 10, the wavelength of the detecting light in this case is selected as a proper wavelength. Accordingly, it is unnecessary to preliminarily store the focal positions of the detecting light having different wavelengths in the ROM of the control means.

The detecting light applied to the workpiece 10 is reflected on the surface of the workpiece 10. The reflected light from the workpiece 10 is transmitted through the focusing lens 33 and next reflected on the total reflection mirror 32 and the partial transmission mirror 42. Thereafter, the reflected light is partially reflected by the beam splitter 43 to enter the detecting section 44. The reflected light is next divided into a reflected beam and a transmission beam by the beam splitter 441 in the detecting section 44. The reflection beam from the beam splitter 441 is focused by the focusing lens 443 in the detecting section 44 to enter the first photodetector 442a. On the other hand, the transmission beam from the beam splitter 441 is linearly focused by the cylindrical lens 444 and next restricted to a predetermined unit length by the one-dimensional mask 445 to enter the second photodetector 442b.

The first and second photodetectors 442a and 442b detect the light quantities of the two beams from the beam splitter 441 and output the voltage signals corresponding to the detected light quantities to the control means. The control means calculates a surface displacement of the workpiece 10 from the ratio (V1/V2) between the voltage value V1 output from the first photodetector 442a and the voltage value V2 output from the second photodetector 442b and adjusts a voltage value to be applied to the actuator 35 as the focal position adjusting means according to the surface displacement calculated above. As a result, the actuator 35 is expanded or contracted to thereby move the focusing lens 33 by a predetermined amount in the direction perpendicular to the workpiece 10, thus adjusting the focal position of the processing laser beam.

In the laser processing apparatus 1 according to this preferred embodiment, the surface displacement of the workpiece 10 is measured by the surface displacement detecting means and the focal position of the processing laser beam is adjusted according to the result of measurement by the surface displacement detecting means. Accordingly, even when the workpiece 10 has warpage or undulation on the surface, the processing position can be made constant. As a result, any workpiece can be processed accurately.

Further, the detecting light source 41 of the surface displacement detecting means can oscillate light having a plurality of wavelengths, and the wavelength selecting section 45 can select one of the plural wavelengths as the wavelength of the detecting light according to the focal position of the processing laser beam (the position of the focusing lens 33) and the thickness of the workpiece 10. Accordingly, the focal position of the detecting light can be set on or near the surface of the workpiece 10 irrespective of the thickness of the workpiece 10 and the processing conditions. As a result, even when the thickness of the workpiece 10 is large and the focal position of the processing laser beam is set near the surface of the workpiece 10 on the back side thereof, the surface displacement of the workpiece can be detected during the laser processing and the focal position of the laser beam can be corrected in real time.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for processing a workpiece by using a laser beam, comprising:
    holding means for holding said workpiece;
    processing means for applying said laser beam to said workpiece held by said holding means, said processing means having an oscillator for oscillating said laser beam and a focusing lens for focusing said laser beam toward said workpiece;
    surface displacement detecting means for detecting a surface displacement of said workpiece in a thickness direction of said workpiece relative to said holding means; and
    focal position adjusting means for adjusting the position of said focusing lens according to the result of detection by said surface displacement detecting means;
    said surface displacement detecting means including:
        a detecting light source outputting oscillating light having a plurality of wavelengths different from the wavelength of said laser beam to the workpiece;
        a wavelength selecting section for selecting one of said plurality of wavelengths output to the workpiece by the detecting light source;
        a detecting light applying section configured to transmit to said focusing lens said detecting light oscillated from said detecting light source and having the wavelength selected by said wavelength selecting section; and
        a detecting section configured to detect reflected light reflected on said workpiece by the application of said detecting light to said workpiece.

2. The laser processing apparatus according to claim 1, wherein said wavelength selecting section selects the wavelength of light to be focused on or near the surface of said workpiece according to the thickness of said workpiece and/or the focal position of said laser beam.

3. The laser processing apparatus according to claim 1, further comprising control means for operating said focal position adjusting means according to the result of detection by said surface displacement detecting means.

4. The laser processing apparatus according to claim 1, wherein said surface displacement detecting means further includes an optical member for introducing said reflected light to said detecting section, and optical paths for said laser beam, said detecting light, and said reflected light at least between said focusing lens and said workpiece are coaxial.

* * * * *